May 18, 1926.
D. McD. SUSI
DIRECTION INDICATOR
Filed Feb. 26, 1926    2 Sheets-Sheet 2
1,585,272
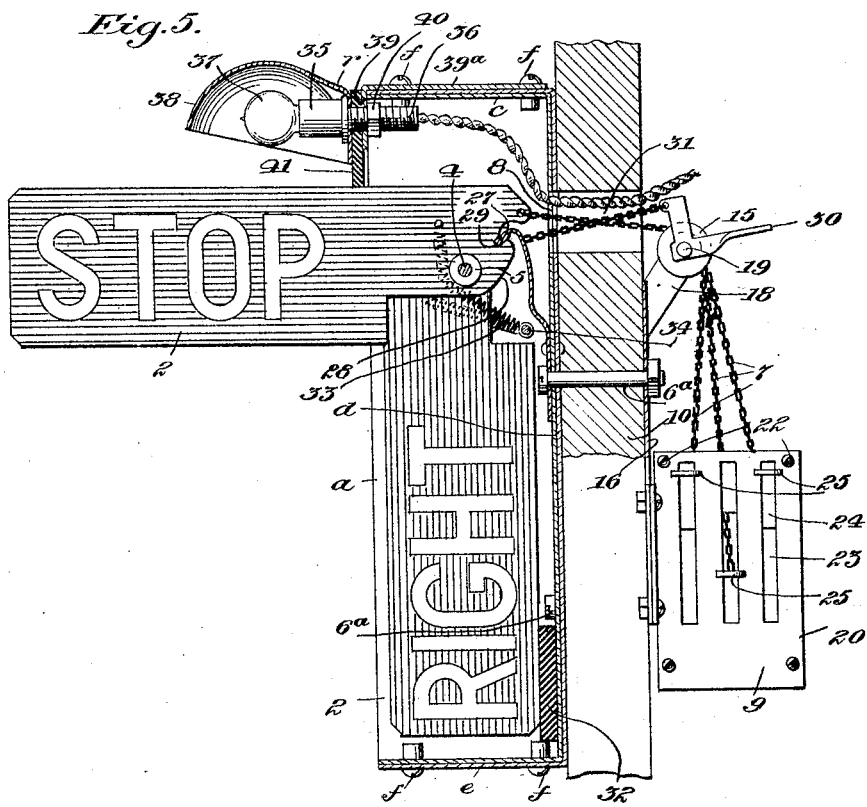
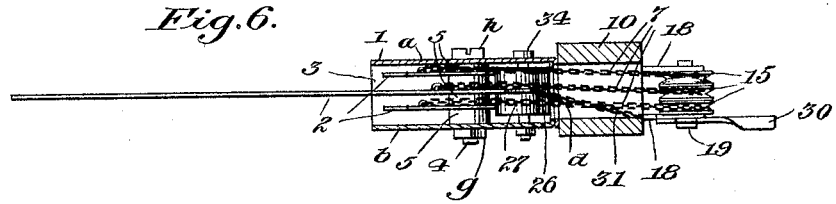
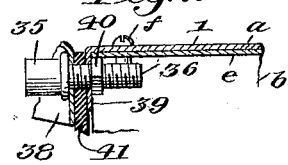
Inventor:
Dominick McD. Susi,
Att'y.

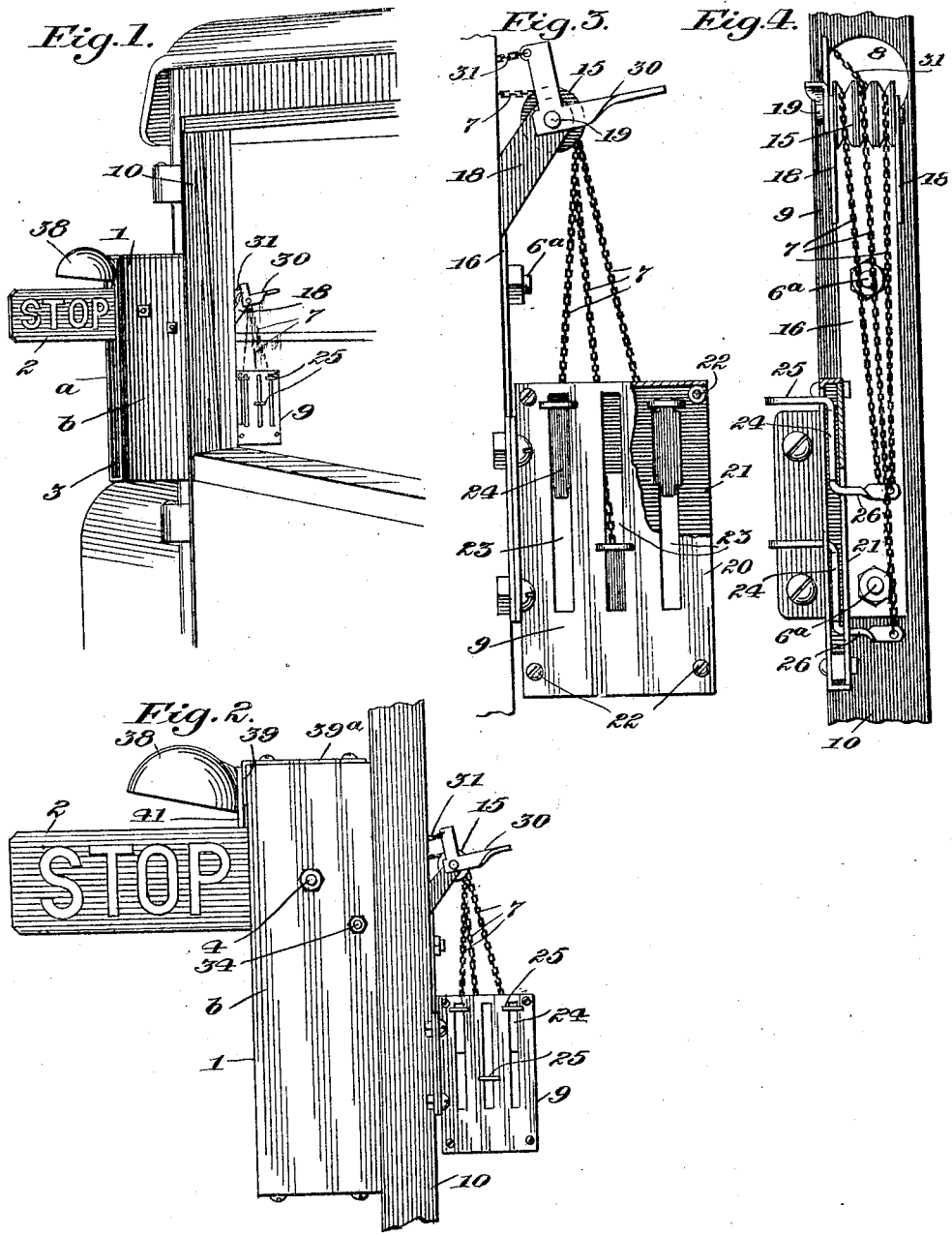

Patented May 18, 1926.

1,585,272

UNITED STATES PATENT OFFICE.

DOMINICK McD. SUSI, OF PITTSFIELD, MAINE.

DIRECTION INDICATOR.

Application filed February 26, 1926. Serial No. 90,819.

The present invention is a direction indicator for vehicles of the type employing movable signal members, for indicating the direction the vehicle is about to take, or to indicate whether it is to stop, and has for its object to produce a simple device of compact structure, having comparatively cheap manufacturing cost, yet, durable and efficient in use and manually operated.

A further object of the invention is to provide such a signaling device, in which the signal members may be selectively operated by depressible keys from within the car, conveniently arranged within the reach of the driver, the mere operation of which will cause the signal to be moved to signaling position and locked therein by a locking element common to all signals, which is operable for releasing the signal to permit it to return to ineffective position.

A still further object of the invention is the provision of a simple, inexpensive, yet attractive and durable mounting of a lamp for illuminating the signals and which lamp will illuminate the side of the car advantageously for night driving.

The invention resides in sundry details of construction combination and arrangement of parts which will be defined as the specification proceeds, and as pointed out in the appended claims.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may be embodied within the scope thereof.

In the drawings which illustrate the preferred embodiment of the invention as at present devised:—

Figure 1 is a fragmentary perspective view of an automobile with the direction indicator of the present invention applied;

Figure 2 is an enlarged elevation of the invention as applied to the automobile;

Figure 3 is an enlarged elevation of the actuator for the direction indicator of the present invention and partially broken away to illustrate detailed construction;

Figure 4 is an elevation of the indicator partially broken away and looking from the right of Figure 3;

Figure 5 is a vertical sectional view through the indicator casing to illustrate detailed construction and operating parts, the actuator being shown in elevation and connected therewith; and Figure 6 is a horizontal sectional view taken substantially on line 6—6 of Figure 5.

Figure 7 is a fragmentary sectional view showing the modified form of the casing.

The indicator of this invention may be applied to any desired portion of the automobile or other vehicle according to the needs, requirements or preference in each particular instance. It is preferred, however, for the purpose of the present illustration, to show the indicator as attached to the left side of the car body at or adjacent the windshield, in order that the same may be viewed by the driver from his seat.

The indicator comprises a casing of such size and dimensions as will conveniently house the signaling arms 2, and preferably takes the form of an elongated casing open at one side as at 3. This casing is constructed of two separable sections, the major portion of which form the front and rear walls, respectively, having marginal edge portions inturned in overlapping relation to form the top, bottom and side walls of the casing. The casing sections are held together by any suitable means which are here shown as screws, extending through openings in the overlapping marginal portions of the sections, the inner marginal portion of the sections being provided at these openings with threads with which the screws engage.

The signal arms 2 are supported in the casing 1 on a shaft 4 having its ends suitably mounted in the front and rear walls of the casing. In the present illustration the shaft takes the form of a bolt having a head $h$ and a threaded end to receive a nut $g$, the bolt extending through suitable means in the rear and front walls. The signal arms 2 are preferably elongated members and the shaft 4 extend through openings in one end of the arms, there being suitable spacing members 5 between each of said arms and the walls of the casing in order to take up lost play and to prevent rattling, which can be eliminated by tightening the nut $g$. The shaft 4 is mounted in the upper portion of the casing 1 so as to permit the signals to depend therefrom and be housed by the casing, normally out of view.

The casing 1 may be attached to the vehicle in any suitable manner, but in the present instance openings 6 as shown on the inner side wall (opposite the opening 3) permit said attachment by bolts, screws or the attachment of the bracket thereto, which latter is used in connection with open or so-called "touring" types of vehicles.

The signal arms 2 are each independently raised from their normal depending position within the casing 1 to a horizontal position by suitable flexible members 7 such as cables, chains, wires and the like attached to an upwardly extending projection on each arm adjacent its pivoted end. The flexible member 7 extends through a suitable opening 8 in the casing, to sheaves or pulleys 15 mounted, preferably, within the vehicle and thence to an actuator, 9, each of said flexible members being slidably connected, respectively, to one of a plurality of depressible keys or movable members mounted in the actuator.

The sheaves and actuator 9 are mounted on the same bracket 16 having openings 17 therein permitting its attachment to the vehicle. When the device is applied to closed automobiles as shown in the drawings, the bracket 16 may be disposed on the opposite side of the post on element 10 of the automobile to which the signal casing 1 is attached and may be held in position by the bolts 6ª which extend through the openings 6 of the casing and 17 of the bracket as clearly shown in the drawings, particularly in Figure 5. The bracket 16, which is, preferably, in the form of a flat strip or plate, is provided on its upper end with laterally extending arms 18 in which the shaft 19 carrying the sheaves 15 is mounted.

The lower end of the bracket 16 has mounted thereon the actuator 9 consisting of a pair of spaced plates 20 and 21 preferably, held together by bolts 22. These plates are each formed with three slots 23 (more or less slots being provided as may be desired or rquired according to the number of signal arms 2 that are used), the slots of one plate being parallel with the corresponding slot of the other plate and in alignment therewith. A number of slidable elements or blocks 24 are provided according to the number of slots 23, each block 24 having its end portions laterally extended through opposing and aligned slots 23 in the actuator 9 to maintain the blocks in position. One of the extended end portions 25 of each block is connected with one of the flexible members 7 and the other extended end portion 26 of each block forms a finger piece or key by which the block may be actuated to traverse the length of the slot 23.

In the normal non-signaling position of the arms 2 the blocks 24 and their respective keys 25 are in their raised or uppermost position. It will therefore be obvious that to move any one of the signals 2 to their signaling position it is only necessary to depress the proper key 25.

In order to lock or maintain the signals 2 in signaling position a spring detent 26 is provided, which is in the form of a flat loose spring having one end suitably secured to the inner side wall $d$ of the casing 1 with its other end portion bent to form a lateral projection 27. The projection 27 normally engages the curved portion 28 of the upper end of the signal arms adjacent the pivoted end, thus exerting a yieldable pressure on the arms to hold them against rattling. As the arms are swung upwardly to horizontal signaling position the detent projection 27 rides upon the surface 28 and when the arms have reached their signaling position the projection engages into a notch or recess 29 thereby locking the signal arm in its position. The signal arm may be released from signaling position by depressing a finger lever 30 in the form of a bell crank lever mounted on the shaft 19 and having one of its arms connected by a flexible member 31. It is obvious that an operation of the lever 30 will withdraw the detent 27 from the notch 29 and permit the signal arm to gravitate to its vertical depending position within the casing 1, a suitable bumper of yieldable material 32, such as rubber, being provided on the inner side wall of the casing to receive the impact and to prevent undue noise and rattling. The return of the signal arms 22 to their normal non-signaling position may be assisted by suitable helical springs 33, one for each of said arms and having one end attached thereto, the other ends of said springs being connected to a transverse rod 34 within the casing. The springs 33 also tend to hold the signal arms within the casing. It is also obvious that when the signal arm has been turned to its normal non-signaling position the flexible members 7 thereof will raise the actuating key 25 in the slot 23 to be depressed for a repeated operation.

A lamp is provided to illuminate the signals for night service when in signaling position. In the present form of the invention the light or lamp consists of electric socket 35 having a threaded tubular extension 36. The socket 35 is to receive the usual electric light bulb 37 around which a reflector 28 is mounted. This reflector consists of a cup-like member having a side portion thereof flattened, as at $r$, and an opening through said flattened portion through which the threaded portion of the socket extends. The light thus assembled is secured to the casing 1 by means of a bracket 39 consisting of a downwardly extending lip at the upper outer side of the casing. This lip 39 may be an integral part of one of the casing sections a or b as shown in Figure 7, or may be a separate element having a right angular extension 39ª to lie on the top wall of the casing and held in position of the screws f which hold the casing sections a and b together. The lip 39 is provided with an opening through which the threaded extension 36 of the lamp socket extends, the parts being held in assembled position by a nut 40 threaded on said extension 36. In order to reduce rattle and to form a bumper against which the signal arms may abut when moved to signaling position, a suitable piece or block of resilient material 41, such as rubber or fiber, is interposed between the flat portion r of the reflector 38 and the supporting lip 39, the bumper 41 extending downwardly from between these elements to a point where it will be engaged by said signal arms.

From the above it will be observed that the signal arm of this invention possesses a very simple and durable construction. It is desired to point out that the light 37 and its reflector are mounted in such a manner and are of such construction as will illuminate the signal arms when in signaling position and will also illuminate practically the entire left side of the automobile which is extremely helpful and advantageous in night driving but will not reflect this light in the eyes of approaching drivers.

What is claimed is:

1. A direction indicator comprising a rectangular casing composed of two complemental separable sectional members the major portion of said member forming two walls thereof and their marginal portion extended at an angular thereto and forming the other walls of the casings, a shaft mounted in opposite walls of said casing wall thereof, and normally contained within said casing, signal arms mounted on said shafts, an elongated slot in said casing through which arms may be moved to sinaling position, operating members connected to each of said arms and extending through an opening from said casing, whereby the signal arm may be actuated.

2. A direction indicator comprising a casing having an opening at one of its sides, signal arms mounted in said casing and normally contained therein, operating members connected with said arms for actuating the latter through said opening in the side of the casing, a downwardly extending lip at the top of the opening in said casing having an opening therein, a reflector having an opening therein, a lamp socket having a threaded extension thereon extending through the opening in said reflector and said lip, a means on said socket extension for securing the parts in assembled relation, whereby said reflector will overlie said signal arms, when in signaling position.

3. A direction indicator set-forth in claim 2 further characterized by a cushion member interposed between said reflector and lip and extending downwardly to provide a bumper engageable by said signal arms when moved to signaling position.

4. A direction indicator as set-forth in claim 2 further characterized by said lip being a portion of a bracket removably secured to the top wall of the casing and extending from said bracket into the opening in the side wall of said casing.

5. A direction indicator comprising movable signal members, means for actuating said signal members, a spring arm mounted adjacent said signaling members and having one end portion provided with a detent engageable with the pivoted end of said members, the pivoted end of each of said members having a notch into which said detent will engage for maintaining said members in signaling position, a connection between said actuating means and said signaling members whereby the latter may be moved to signaling position when said actuating means is operated, and a manually operated means connected with said spring arm whereby the signal will be released and permitted to return to normal position.

6. A direction indicator comprising a plurality of signaling arms pivotally mounted and normally in non-signaling position, a spring detent positioned adjacent said signaling arms and engageable therewith, said signaling arms having a notch therein into which said detent will engage when any of the said arms are moved to signaling position, actuators for each of said arms positioned at a point remote therefrom and having flexible connections with said arms respectively for moving said arms to signaling position, and a detent releasing actuator positioned remote from said signals and having a flexible connection with said detent for moving the latter out of engagement with the notch in each of said arms.

7. A direction indicator comprising a casing, a plurality of signal arms pivotally mounted in the casing and in normally depending non-signaling position therein, said casing having an opening therein through which said signals may be extended to signaling position, a bracket, actuators mounted on said bracket for selectively actuating said signals, flexible connections between each of said actuators and one of said signal arms, respectively, sheaves mounted on said bracket over which said flexible connections pass, a spring arm mounted in said signal casing and having one end forming a detent engageable with the pivoted end of said signal arms, the pivoted end of each of said signals having a notch into which said detent will extend when any or all of said signaling arms are moved to signaling position, for holding said arms in said position, a pivoted lever member mounted on the sheave-shaft and having operable connection with said detent for withdrawing the latter from said notches in said arms, whereby the signal arms may return to non-signaling position.

In testimony whereof I have hereunto set my hand.

DOMINICK McD. SUSI.